March 5, 1968  F. L. MURDOCK  3,371,469
EMULSION TREATER

Filed Oct. 18, 1965  2 Sheets-Sheet 1

INVENTOR.
FORREST L. MURDOCK

BY
*Head & Johnson*

ATTORNEYS

March 5, 1968 F. L. MURDOCK 3,371,469
EMULSION TREATER

Filed Oct. 18, 1965 2 Sheets-Sheet 2

INVENTOR.
FORREST L. MURDOCK

BY
*Head & Johnson*

ATTORNEYS

United States Patent Office 3,371,469
Patented Mar. 5, 1968

3,371,469
EMULSION TREATER
Forrest L. Murdock, 2420 E. 24th, Tulsa, Okla. 74114
Filed Oct. 18, 1965, Ser. No. 496,967
8 Claims. (Cl. 55—175)

This invention relates to an emulsion treater for crude oil. More particularly, the invention relates to an emulsion treater for crude oil including means of subjecting the emulsion being treated to an electric field. Still more particularly, the invention relates to an emulsion treater for crude oil including means for separating water and gas from the emulsion and including means of subjecting the emulsion to an electric field to augment the separation of water and gas therefrom.

The use of treaters for separating water and gas from crude oil emulsions is well known in the petroleum industry. Typically, such treaters include means of subjecting crude oil having water and gas entrained therein heated to lower the viscosity of the emulsion and thereby to permit the entrained water droplets to more completely settle out. Improvements in such treating means include the provision for the separation of entrained gas from the emulsion.

It has been known for many years that subjecting emulsions to electric fields has the tendency to coalesce the water droplets in the emulsion so that the water more easily and efficiently settles out. Up to the present time, however, there has been no widespread adoption of the use of electric fields in conjunction with the treating of crude oil emulsions, primarily for two reasons. First, previously used devices have not provided means of controlling the electric field so as to adapt the equipment to varying field conditions. Second, the expense of providing electric treaters has been prohibitive. This invention, in accordance with its basic object, provides a means of utilizing electric field treatment of emulsions in conjunction with standard treating processes in a manner which is both economical and which provides complete control of the electric field.

It is a more particular object of this invention to provide a treater for crude oil emulsions including means of subjecting the emulsions to the action of both heat and an electric field to achieve increased separating effectiveness.

Another object of this invention is to provide a treater for treating oil well emulsions including more effective means of subjecting the emulsions to an electrostatic field during the treating process.

Another object of this invention is to provide a treater for treating crude oil emulsions including means of subjecting the emulsions to sequential electric fields for a more effective separation of entrained water.

Another object of this invention is to provide a treater for treating crude oil emulsions including means of subjecting the emulsions to an electric field and including means of mechanically and electrically varying the intensity of the electric field.

A further object of this invention is to provide a treater for treating crude oil emulsions including means of subjecting the emulsions to an electric field and including means of preventing the accumulation of paraffin on the grids utilized for the establishment of the electric field.

Another object of this invention is to provide an emulsion treater for treating crude oil emulsions including means of monitoring the water content of the emulsion being treated and for de-energizing the electric field when the water content of the emulsion approaches the point wherein the electric field would be shorted.

Another object of this invention is to provide an emulsion treater for crude oil emulsions including means of subjecting the emulsions to an electric field, the invention being characterized by simplicity, economy of construction, and dependability.

These and other objects will be fulfilled and a better understanding of the invention had by referring to the following description and claims taken in conjunction with the attached drawings in which:

This invention may be described as an emulsion treater for crude oil emulsions. More particularly, but not by way of limitation, the invention may be described as an emulsion treater for crude oil comprising a closed vessel, a baffle separating said closed area into a first and second class settling zone, the vessel having a crude oil inlet communicating with the first quiescent settling zone, a crude oil outlet communicating with the second quiescent settling zone and a water outlet in the lower portion of each of the quiescent settling zones, and an electric grid system forming a portion of the baffle, the fluid passing from the first to the second quiescent settling zone passing through the grid system, the grid system having first and second spaced apart grids insulated from each other and having an electric voltage potential therebetween.

Figure 1:
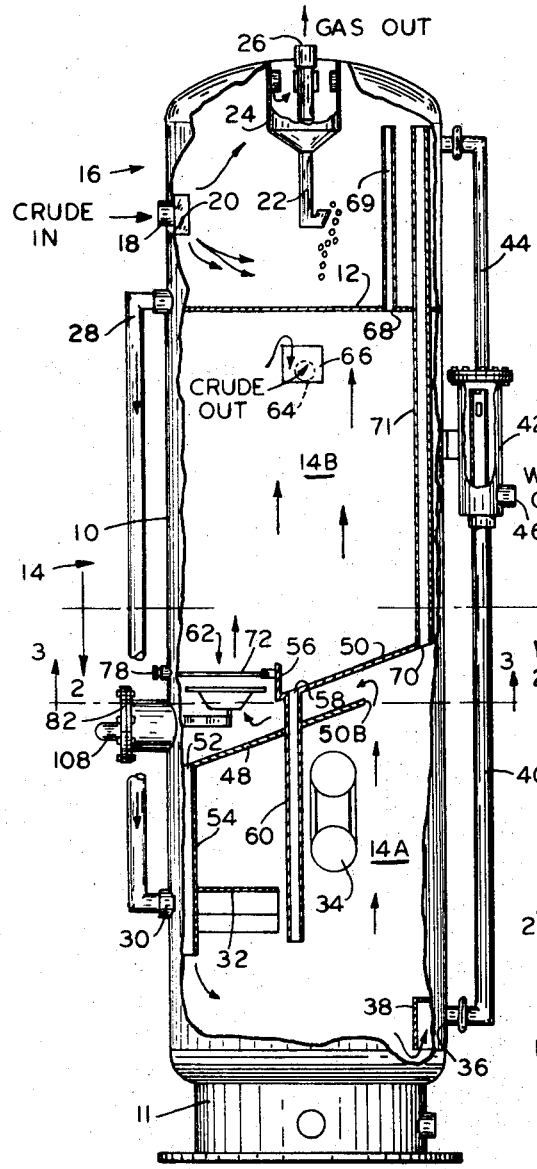
FIGURE 1 is a cross-sectional elevational view of a crude oil treater embodying the principles of this invention.

Referring first to FIGURE 1, an illustrated embodiment of the invention is shown in cross-section including an upstanding vessel 10 supported on a base 11. The vessel 10 is divided into two basic portions by a horizontal wall 12 providing a lower water separation area, generally indicated by the numeral 14, and an upper gas separation area, generally indicated by the numeral 16. A crude oil inlet 18 is provided in the vessel whereby crude oil, which is almost always an emulsion containing entrained water and gas, enters the gas separation area 16. A baffle 20 positioned in the path of inlet 18 serves to distribute the inlet flow of crude oil. The upper gas separation section 16 is generally empty of liquid and is provided with a gas outlet pipe 22. The gas rising out of the inflowing crude oil within the open gas separation portion 16 passes out through pipe 22 and through a mist extractor 24 and thence out through a gas outlet pipe 26.

The open area 16 of the treater is usually the first nonconfined area to which crude oil pumped from below the surface of the earth is exposed. Thus, occasion is first presented in area 16 for the escape of gas entrained with the crude oil after it reaches the surface of the earth. Crude oil flowing into the gas separation portion 16 flows out and downwardly through emulsion conduit 28 and through emulsion inlet opening 30 into the lower portion of the water separation section 14. A baffle system 32 serves to distribute the inlet flow of crude oil emulsion and diminish agitation caused by the inlet flow.

The lower water separation section of the treater of this invention which, as previously indicated, is generally represented as the numeral 14 is, according to the principles of this invention, divided into two portions, that is, a lower quiescent zone 14A and a upper quiescent zone 14B. In the illustrated embodiment of FIGURE 1 the crude oil emulsion first enters the lower quiescent zone 14A. A heater 34, of a type well known in the oil industry, is provided in the lower zone 14A where the crude oil emulsion is subjected to heat to raise the temperature thereof. The amount of heat necessary to be imparted to the emulsion being treated depends on several factors including the viscosity of the emulsion, the temperature of the emulsion when it reaches the treater, the temperature of the atmosphere surrounding the treater, and other factors. In some instances, particularly in summer weather or hot climates, it is not necessary to impart heat. Heater 34 may be controlled automatically according to the well known principles in present use in the industry. The purpose of heating the emulsion is primarily to raise the temperature and thereby lower the viscosity. The lower the viscosity of the emulsion the greater is the propensity for entrained water droplets to settle out by the effect of gravity in the quescent zones of the treater.

Water which settles out of the emulsion in the quiescent zone 14A accumulates in the bottom of the vessel and is drawn out through water outlet 36. A baffle 38 closes the outlet to prevent undue agitation of liquid in the quiescent zone. Water outlet pipe 40 connects the outlet opening 36 with a water siphon 42. The siphon is further provided with a pressure equalizing conduit 44 which communicates with the upper interior end of vessel. Water is drawn by the siphon 42 out through outlet 46. The siphon 42 is a standard means of withdrawing water from the crude oil emulsion treater and does not, within itself, form a part of the invention as other means, such as a float valve, may be used to control the water discharge from the treater. Intermediate the upper and lower ends of the vessel 10 and separating the lower and upper quiescent zones 14A and 14B are inclined overlapping baffles 48 and 50. The lower baffle 48 is affixed to one side of the vessel 10 and extends upwardly and outwardly to more than half of the internal width of the vessel. In like manner, the upper inclined baffle 50 is affixed to the opposite sides of the vessel 10 and is inclined outwardly and downwardly so as to be parallel to and spaced from the lower inclined baffle 48. One of the basic purposes of the baffle system consisting of baffles 48 and 50 is to provide two quiescent zones within the lower water separation section 14 of the vessel 10.

Baffles 48 and 50 each are preferably of planar substantially semi-elliptical configuration having arcuate portions 48A and 50A respectively in engagement with the interior wall of the vessel 10 and straight edges 48B and 50B respectively adjacent the center of the vessel. While this illustrated configuration is preferred, obviously various other configurations are possible within the meaning of the geometrical description given.

An opening 52 is provided in the lower portion of the lower baffle 48 adjacent the wall of the vessel, the opening communicating with a downwardly extending pipe 54. The purpose of the opening 52 and pipe 54 is to provide a water drain for the water which settles out of the crude oil emulsion.

A horizontal member 56 is supported within the vessel above the lower inclined baffle 48 and in a plane perpendicular to the upper baffle 50. The vertically extending horizontal member 56 forms a trough at the lower end of the upper baffle 50, the trough member forming a boundary and support for the upper baffle. An opening 58 is provided in the upper baffle 50 adjacent the trough member 56 and is communicated with by a downwardly extending pipe 60 which serves the same function as previously mentioned with reference to pipe 54, that is, it carries downwardly into the lower end of the vessel 10 water which settles out of the emulsion in the upper quiescent zone 14B.

An important part of this invention is an electric grid system, generally indicated by the numeral 62, positioned to receive the flow of emulsion therethrough; the grid system 62 will be described in more detail subsequently.

As indicated by the arrows, the emulsion enters the lower quiescent zone 14A through emulsion inlet 30 and passes upwardly past heater 34, under the lower baffle 48, between the upper and lower baffles 48 and 50, through the electric grid system 62 and upwardly through the upper quiescent zone 14B. Water entrained in the emulsion settles out in quiescent zones 14A and 14B. The crude oil after having most of the gas and water extracted by the treater passes out through outlet opening 64 at the upper end of the quiescent zone 14B. A baffle 66 extends over the opening and in spaced relationship with the opening 64 to reduce the turbulence caused by the fluid flow. An opening 68 is provided in the horizontal wall 12 and communicates with a vertically extended pipe 69 providing a means whereby gas escaping from the emulsion in quiescent zone 14B may flow upwardly into the upper gas separation section 16. In like manner, in opening 70 in the upper end of the upper inclined baffle 50 adjacent the wall of vessel 10 communicating with the pipe 71 which extends through the horizontal wall 12 it provides means whereby gas released from the emulsion in the lower quiescent zone 14A may flow into the upper gas separating section 16.

Figure 2:
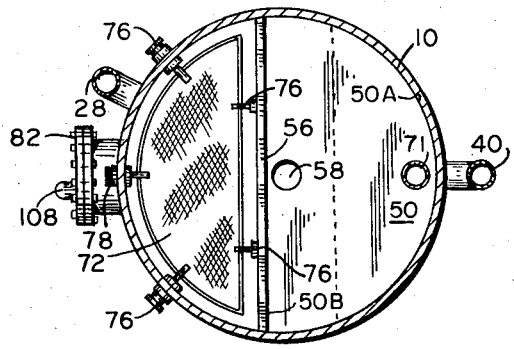
FIGURE 2 is a cross-sectional view taken along the line 2—2 of FIGURE 1.
Figure 5:
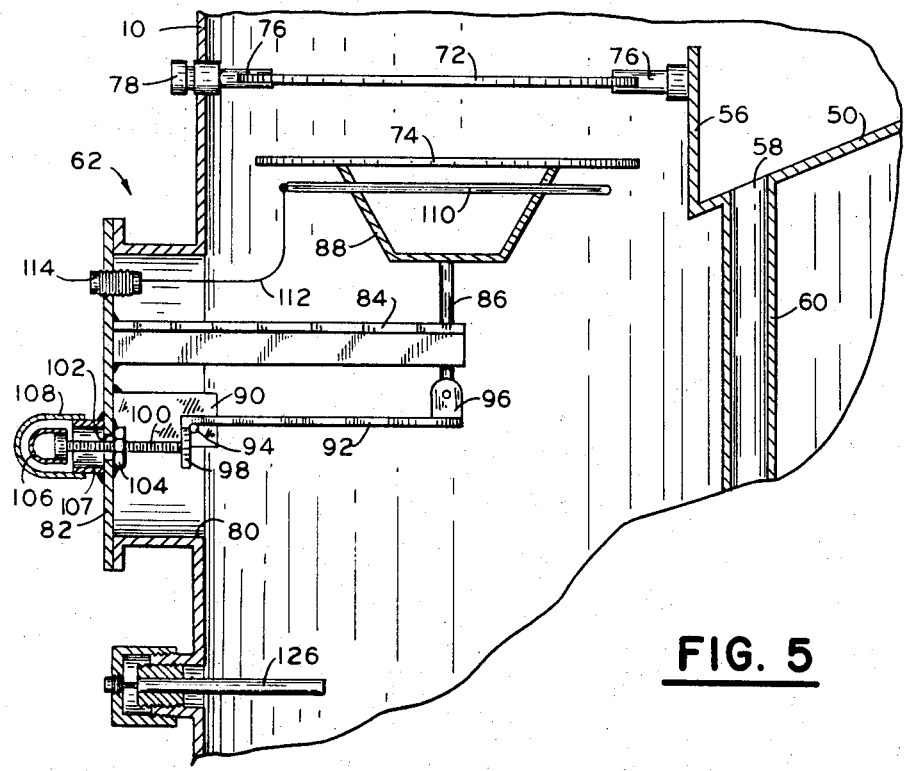
FIGURE 5 is an enlarged segmented cross-sectional view showing in more detail the mounting of the portion of the treater of this invention wherein the emulsion is subjected to an electric field and showing means whereby the intensity of the fields may be mechanically varied.

As previously indicated, one of the important features of this invention is the provision of means of exposing the emulsion to an electric field provided by the electric grid system 62. Referring to FIGURE 5, the electric grid system of the invention is shown in larger detail. Basically the grid system consists of hot grid 72 which is impressed with an electric voltage potential relative to a ground grid 74 maintained at the potential of the vessel, so that an electric field exists between the grids 72 and 74. Insulators 76 support the hot grid 72 (see FIGURE 2). An insulating electrical connector 78 provides means whereby electric potential is conveyed from the exterior of the vessel to the hot grid 72.

To afford means of installing, inspecting and calibrating the electrical grid system of the invention an opening 80 is provided in the vessel 10, covered by man-way cover 82. A support bracket 84 extends horizontally from the interior of the man-way cover 82 and provides means for supporting the ground grid 74. As shown, a vertically extending rod 86 has affixed at the upper end thereof a support frame which supports the ground grid 74. Rod 86 is slidably supported by the bracket 84.

A second bracket 90 extends from the man-way cover 82 below and parallel to the support bracket 84, the bracket 90 pivotally supporting a pivot arm 92, the arm being pivoted about pin 94 which extends from bracket 90. The outer end of the pivot arm 92 has a vertical bracket 96 which pivotally is affixed to the lower end of the ground grid rod 86. A threaded bolt 100 extending through an opening 102 in the man-way cover 82 and has the inward end thereof in engagement with a downwardly extending leg portion 98 of pivot arm 92. The bolt 100 may be threadably supported in a variety of ways such as by a threaded nut 104 welded to the interior of the man-way cover 82. The outer end of the bolt 100 is provided with a head 106 by means of which the bolt is easily threadably advanced or retarded. A tubular collar member 107 affixed to the outer surface of the man-way cover 82 encloses the opening 102 and receives the threaded cover 108 whereby the opening 102 is closed.

It can be seen by threadably positioning bolt 100, the pivot arm 92 is varied and thereby the elevation of the ground grid 74 varied to change the spacing between the hot grid 72 and the ground grid 74. In this way, the intensity of the electric field, which is generally inversely proportional to the distance between the grids, is thereby adjustable.

Figure 3:
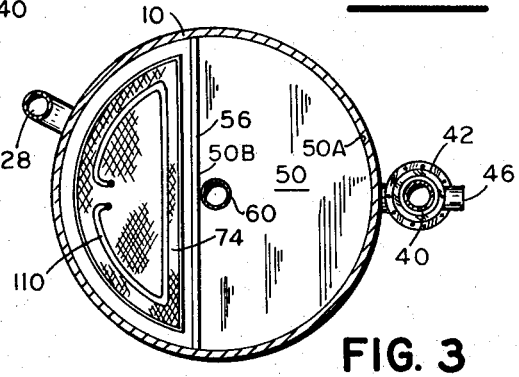
FIGURE 3 is a cross-sectional view taken along the line 3—3 of FIGURE 1.

An additional important element of this invention is the provision of means of preventing the accumulation of paraffin on the grids 72 and 74. This is accomplished by supporting a heating element 110 directly below the ground grid 74 (see FIGURES 3 and 5). The heating element is connected to an electrical source by a conductor 112 which extends through an insulator connector 114 in the man-way cover 82.

Figure 6:
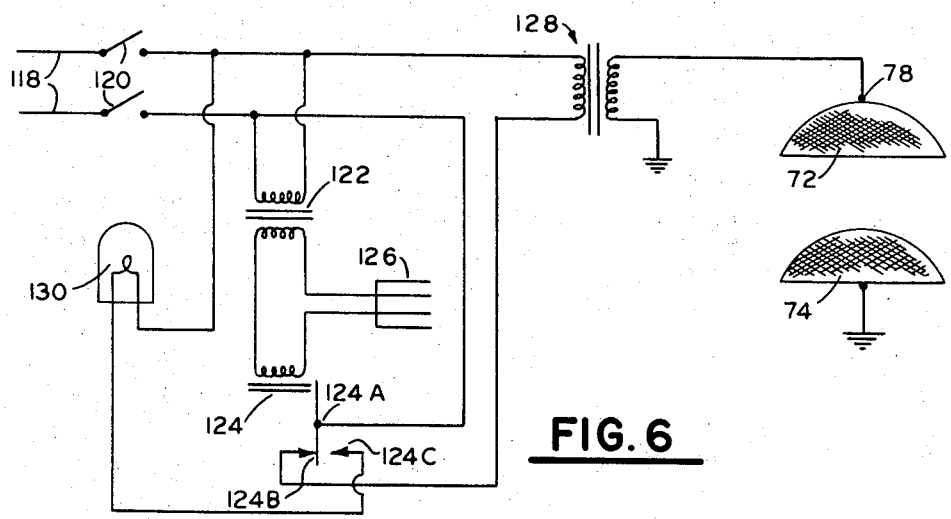
FIGURE 6 is a simplified schematic electrical diagram showing the means whereby the electrical energy to the device creating the electric field in the emulsion treater of this invention is terminated when the water content of the emulsion being treated reaches a point wherein the electric grids utilized to establish the electric field would possibly be shorted.

An additional important part of the invention is the provision of means of safe-guarding the electrical grid system by controlling the electrical potential supply to the grid in such a manner that the grid potential is automatically discontinued when the water content of the emulsion being treated approaches that which would short circuit the grid elements. By short circuit it is meant that the water content, which directly affects the conductivity of the emulsion, becomes so high that the current flow between the grid 72 and 74 exceeds the current carrying potential of the electrical facilities supplying the grid system. This system of automatically interrupting the voltage to the grid system when excessive water content occurs is best illustrated in the circuit diagram of FIGURE 6. Voltage is supplied to the grid system by means of conductors 118. Circuit breaker 120 is provided as a means of energizing or de-energizing the electrical grid system. A low voltage transformer 122 is energized when circuit breakers 120 are closed, the secondary of the low voltage transformer 122 providing voltage to energize a relay 124. Relay 124 includes a clapper arm 124A and contacts 124B and 124C. In series with the relay 124 is a capacitance probe 126 which is responsive to the water content of the emulsion. As shown in FIGURE 5, the capacitance probe 126 is positioned in the treater directly below the grid system so that the water content of the emulsion passing upwardly through the grid system is detected. The capacitance probe 126 is a standard item of equipment utilized in the petroleum industry, especially in automatic custody transfer equipment. In the circuit of FIGURE 6, the capacitance probe functions to provide a high resistance circuit when the water content of the emulsion is below a preselected level. As long as the probe 126 has a high resistance relay 124 is non-actuated so that continuity as provided with relay contact 124B and thereby with high voltage transformer 128. The secondary of high voltage transformer 128 is communicated through insulated electrical connector 78 to the hot grid 72. With the hot grid 72 energized an electrical field is created between the hot and cold grids.

If the capacitance probe 126 detects a water level at or above preselected maximum tolerable percentage, a low resistance circuit is presented which causes relay 124 to actuate, interrupting voltage to the high voltage transformer 128 and at the same time applying voltage to an indicator light 130.

Figure 4:
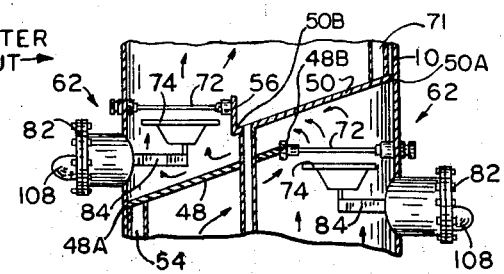
FIGURE 4 is a partial cross-sectional view showing the arrangement wherein the emulsion is subjected to two sequential electric fields in the treating process.

FIGURES 1, 2, 3 and 5 illustrate the arrangement wherein a single electric grid system is provided through which the emulsion being treated passes during its flow through the emulsion treater of this invention. FIGURE 4 illustrates an arrangement wherein two separate electric grid systems 62 are provided through which the emulsion being treated passes.

OPERATION

Referring to FIGURE 1, crude oil flows into the treater through inlet 18. As previously indicated the open enclosure of the upper gas separation section 16 provides, in normal operating circumstances, the first unconfined exposure of the produced crude oil, so that a large percentage of the gas entrained is separated out. Gas flows out of the treater through gas outlet 26. Crude oil, with most of the gas removed, flows downwardly through pipe 28 and enters the lower portion of the lower quiescent zone 14A. The crude oil emulsion migrates upwardly in quiescent zone 14 which, being a relatively large volume, the upward migration of the emulsion is relatively slow so that water entrained within the crude oil settles out into the lower portion of the treater. Positioned in the lower quiescent zone 14A is a heater 34 whereby heat may be imparted to the emulsion as required to augment the separation and settlement by gravitational effect of water from the crude oil emulsion. The emulsion passes upwardly and around the lower inclined baffle 48, and thence downwardly between the upper and lower inclined baffles 48 and 50. As the emulsion emerges from between the baffles 48 and 50 the direction of flow is reversed causing additional entrained water to fall out of the emulsion and onto the upper surface of baffle 48 where it runs downwardly and through opening 52 in pipe 54 into the lower water accumulating portion of the treater.

The emulsion then passes upwardly through and between the electric grid system 62. With the hot grid 72 energized an electrical potential is provided between the grids 72 and 74. The arrangement of the grid system of this invention is such that all of the emulsion flows upwardly through the electrical grid system and is exposed to the electric field. According to the well known principle of precipitation the subjection of the emulsion to the electric field causes any entrained water droplets to coalesce into larger droplets and thereby more readily separate out of the emulsion. By the arrangement of this invention the flow of the emulsion is such that immediately after subjection to the electric field the emulsion enters into the upper quiescent zone 14B where the water droplets are afforded a second opportunity to fall out of the slow moving stream. In the upper quiescent zone 14B water droplets which settle out of the emulsion fall downwardly onto the upper surface of either baffle 48 or 50 and flow downwardly into the lower water storage portion of the treater through pipes 54 or 60.

Any gas which is separated in quiescent zone 14A passes upwardly through opening 70 and pipe 71 into the gas separation section. In like manner, gas separating from the emulsion in quiescent zone 14B passes upwardly through opening 68 and pipe 69 into the gas separation section.

The crude oil having gas and water removed by the separation system of this invention flows from the treater outlet 64.

The grid system, as best illustrated in FIGURE 5, provides a means whereby the spacing between the grids 72 and 74 is easily adjusted to achieve the intensity of the electric field desired. The required spacing between grids 72 and 74 is primarily dependent upon the type of the emulsion being treated, the temperature of the emulsion, the water content, and other factors. By experimentation the optimum spacing and voltage potential between the grid elements to achieve maximum separating efficiency is easily determined. It can be seen that with the grids 72 and 74 separated further apart the intensity of the electric field is decreased but the time duration exposure of each molecule of emulsion moving upwardly through the system is increased.

Onerous problems which have forestalled widespread adaptation of electric treating of crude oil emulsions in the past are solved by the principles of this invention. Among the many advantages of the treater of this invention are: First, a treater is provided having flow paths whereby the emulsion is subjected to two separate quiescent zones having an electric field between the zones. Second, the treater is arranged such that most of the water and gas are removed before the emulsion passes through the electric grids, reducing the chance of the grids being shorted by high water content. Third, a system is provided for removal of paraffin accumulation on the grids. Heating element 110 can be energized as required to raise the temperature of the emulsion surrounding the grids sufficient to melt away any paraffin accumulation which would otherwise build up, especially when treating high paraffin content crudes, which would soon short the grids or, at a minimum, impair the effect of the electric field. Fourth, a means is provided, by the use of capacitance probe 126 in the circuit arrangement of FIGURE 6, to automatically detect the existence of entrained water concentration which could result in short circuiting the grids 72 and 74 and steps are automatically taken to de-energize the grid system before damage occurs.

The alternate embodiment of FIGURE 4 illustrates a means whereby the grid system may be affixed to either the upper baffle 50, the lower baffle 48 or, as illustrated, a dual sequential electric grid system is provided for the emulsion subjected to two electric fields as it travels through the treater. An important advantage of the dual electrode arrangement of FIGURE 4 is that the failure of one grid system does not terminate electric field treatment since the other grid system will continue to function, providing an improved margin of dependability.

While the invention has been described with a certain degree of particularity it is manifest that many changes may be made in the details of construction and the arrangement of components without departing from the spirit and scope of this disclosure.

What is claimed:

1. An emulsion treater for crude oil comprising:
   an upstanding closed vessel having a water outlet adjacent the bottom thereof;
   a horizontal baffle means dividing said vessel into an upper and lower quiescent chamber, said baffle being partly defined by an imperforate portion, and partly by a pair of spaced upper and lower horizontal grids through which crude oil passes flowing from said lower to said upper chamber;
   means to electrically charge one of said upper and lower grids relative to the other;
   a crude oil inlet in said vessel communicating with said lower chamber;
   a crude oil outlet in said vessel communicating with the upper portion of said upper chamber; and
   said baffle means imperforate portion being a substantially semi-elliptical planar member defined by a straight edge and an arcuate edge, the arcuate edge thereof being in engagement with the internal wall of said vessel, said imperforate portion sloping downwardly from the arcuate edge at the vessel interior wall to the straight edge adjacent the center of the vessel, and including a planar vertical support member affixed at each end thereof to the interior wall of the vessel and having the lower edge thereof affixed to said straight edge of said imperforate portion, said imperforate portion and said vertical support member defining a trough extending from wall to wall within said vessel, said upper grid being supported between said vertical support member and the interior wall of said vessel opposite said imperforate portion.

2. An emulsion treater according to claim 1 wherein said baffle means imperforate portion has an opening therein adjacent said vertical support member and a water conducting pipe communicating with said opening in said imperforate portion extending downwardly and terminating in the lower portion of said lower chamber.

3. An emulsion treater according to claim 1 wherein said horizontal baffle means imperforate portion is an upper imperforate portion;
   a planar vertical support member affixed at each end thereof to the interior wall of the vessel and having the lower edge thereof affixed to said straight edge of said upper imperforate portion, said upper imperforate portion and said vertical support member defining a trough extending from wall to wall within said vessel; and a
   lower imperforate portion being a substantially semi-elliptical planar member defined by a straight edge and an arcuate edge, the arcuate edge thereof being in engagement with the internal wall of said vessel, the imperforate portion sloping upwardly from the arcuate edge adjacent the center of the vessel, said lower and upper imperforate portions being parallel to and spaced from each other, and overlapping, the arcuate edge of each being spaced opposite the other, and wherein said upper grid is supported between the straight edge of one of said upper and lower imperforate portions and the interior wall of said vessel opposite said imperforate portion.

4. An emulsion treater according to claim 3 including a first and second pair of spaced paralleled upper and lower grids, the upper grid of one pair being supported between said vertical support member and the interior of said vessel opposite and upper imperforate portion arcuate edge, and the upper grid of the other pair being supported between the straight edge of said lower imperforate portion and the interior wall of said vessel opposite said lower imperforate portion arcuate edge, and including means to electrically charge one of said upper and lower grids relative to the other of both pairs.

5. An emulsion treater for crude oil comprising:
   an upstanding closed vessel having a water outlet adjacent the bottom thereof;
   a horizontal partition intermediate the top and bottom thereof dividing the vessel into an upper gas separation section and a lower water separation section;
   a horizontal baffle means dividing said water separation section of said vessel into an upper and lower quiescent chamber, said baffle being partly defined by an imperforate portion, and partly by a pair of spaced upper and lower horizontal grids through fluid passes flowing from said lower to said upper chamber;
   means to electrically charge one of said upper and lower grids relative to the other;
   a crude oil inlet and said vessel communicating with said gas separation section;
   a crude oil outlet in said vessel communicating with said upper portion of said upper chamber;
   a gas outlet in said vessel communicating with the upper portion of said gas separation section;
   a conduit communicating the lower portion of said gas separation section with the lower portion of said lower quiescent chamber; and
   wherein said baffle means imperforate portion is a substantially semi-elliptical planar member defined by a straight edge and an arcuate edge, wherein the arcuate edge thereof is in engagement with the internal wall of said vessel wherein said imperforate portion slopes downwardly from the arcuate edge at the vessel interior wall to the straight edge adjacent the center of the vessel, and including a planar vertical support member affixed at each end thereof to the interior wall of the vessel and having the lower edge thereof affixed to said straight edge of said imperforate portion, said imperforate portion and said vertical support member defining a trough extending from wall to wall within said vessel, said upper grid being supported between said vertical support member and the interior wall of said vessel opposite said imperforate portion.

6. An emulsion treater according to claim 5 wherein said baffle means imperforate portion has an opening therein adjacent said vertical support member and a water conducting pipe communicating with said opening in said imperforate portion extending downwardly and terminating in the lower portion of said lower chamber.

7. An emulsion treater for crude oil comprising:
   an upstanding closed vessel having a water outlet adjacent the bottom thereof;
   a horizontal partition intermediate the top and bottom thereof dividing the vessel into an upper gas separation section and a lower water separation section;
a horizontal baffle means dividing said water separation section of said vessel into an upper and lower quiescent chamber, said baffle being partly defined by an imperforate portion, and partly by a pair of spaced upper and lower horizontal grids through which fluid passes flowing from said lower to said upper chamber;
means to electrically charge one of said upper and lower grids relative to the other;
a crude oil inlet in said vessel communicating with said gas separation section;
a crude oil outlet in said vessel communicating with said upper portion of said upper chamber;
a gas outlet in said vessel communicating with the upper portion of said gas separation section;
a conduit communicating the lower portion of said gas separation section with the lower portion of said lower quiescent chamber;
said horizontal baffle means including an upper and a lower imperforate portion, said upper imperforate portion being a substantially semi-elliptical planar member defined by a straight edge and an arcuate edge, the arcuate edge thereof being in engagement with the internal wall of said vessel, said upper imperforate portion sloping downwardly from the arcuate edge of the vessel interior wall to the straight edge adjacent the center of the vessel;
a planar vertical support member affixed at each end thereof to the interior wall of the vessel and having the lower edge thereof affixed to said straight edge of said imperforate portion, said upper imperforate portion and said vertical support member defining a trough extending from wall to wall within said vessel; and
said lower imperforate portion being a substantially semi-elliptical planar member defined by a straight edge and an arcuate edge, the arcuate edge thereof being in engagement with the internal wall of said vessel, the imperforate portion sloping upwardly from the arcuate edge adjacent the center of the vessel, said lower and upper imperforate portions being parallel to and spaced from each other and overlapping, the arcuate edge of each being spaced opposite the other, and said upper grid being supported between the straight edge of one of said upper and lower imperforate portions and the interior wall of said vessel opposite said imperforate portion.

8. An emulsion treater according to claim 7 including a first and second pair of spaced parallel upper and lower grids, the upper grid of one pair being supported between said vertical support member and the interior of said vessel, opposite said upper imperforate portion, arcuate edge, and the upper grid of the other pair being supported between the straight edge of said lower imperforate portion and the interior wall of said vessel opposite said lower imperforate portion arcuate edge, and including means to electrically charge one of said upper and lower grids relative to the other of both pairs.

References Cited

UNITED STATES PATENTS

| 1,276,387 | 8/1918 | McKibben | 204—308 X |
| 1,281,952 | 10/1918 | Harris | 204—304 X |
| 2,785,766 | 3/1957 | Murdock | 55—175 X |
| 2,936,073 | 5/1960 | Thompson | 210—396 X |
| 3,043,072 | 7/1962 | Walker et al. | 55—45 |

FOREIGN PATENTS

| 452,437 | 11/1927 | Germany. |

SAMIH N. ZAHARNA, *Primary Examiner.*

REUBEN FRIEDMAN, *Examiner.*

R. BURKS, *Assistant Examiner.*